US009939554B2

(12) United States Patent
Wang et al.

(10) Patent No.: US 9,939,554 B2
(45) Date of Patent: Apr. 10, 2018

(54) WIDE-VIEW OPTICAL FILM HAVING REVERSED WAVELENGTH DISPERSION

(71) Applicant: AKRON POLYMER SYSTEMS, INC., Akron, OH (US)

(72) Inventors: Bin Wang, Kingsport, TN (US);
Thauming Kuo, Kingsport, TN (US);
Ted Germroth, Kingsport, TN (US);
Dong Zhang, Uniontown, OH (US);
Doug McWilliams, Piney Flats, TN (US); Frank Harris, Boca Raton, FL (US); Jiaokai Jing, Uniontown, OH (US); Xiaoliang Zheng, Hudson, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 0 days.

(21) Appl. No.: 13/748,895

(22) Filed: Jan. 24, 2013

(65) Prior Publication Data

US 2014/0205822 A1 Jul. 24, 2014

(51) Int. Cl.
| | |
|---|---|
| *G02B 1/00* | (2006.01) |
| *B29C 55/02* | (2006.01) |
| *B32B 7/02* | (2006.01) |
| *F21V 9/00* | (2018.01) |
| *G02B 1/04* | (2006.01) |
| *G02B 27/28* | (2006.01) |
| *G02B 5/30* | (2006.01) |
| *G02F 1/13363* | (2006.01) |

(52) U.S. Cl.
CPC ............ *G02B 1/007* (2013.01); *B29C 55/026* (2013.01); *B32B 7/02* (2013.01); *F21V 9/00* (2013.01);

(Continued)

(58) Field of Classification Search
CPC .......... G02F 1/133634; G02F 1/13363; G02F 2001/133637; G02F 2413/13;
(Continued)

(56) References Cited

U.S. PATENT DOCUMENTS 7,480,021 B2  1/2009  Rao et al.
7,948,591 B2  5/2011  Sakai
(Continued)

FOREIGN PATENT DOCUMENTS

CN   101720446     6/2010
EP    1898252 A1   3/2008
(Continued)

OTHER PUBLICATIONS

Yeh, et al., "Optics of Liquid Crystal Displays", 2010, John Wiley & Sons, Inc., 2nd Edition, pp. 614-615.*

*Primary Examiner* — Brian Handville
(74) *Attorney, Agent, or Firm* — Benesch, Friedlander, Coplan & Aronoff LLP

(57) ABSTRACT

An optical compensation film is disclosed herein, which is made by uniaxially or biaxially stretching of a multilayer film including a first polymer film having a refractive index profile satisfying the equations of $(n_x+n_y)/2 \geq n_z$ and $|n_x-n_y|<0.005$ and a second polymer film having a refractive index profile satisfying the equations of $(n_x+n_y)/2 < n_z$ and $|n_x-n_y|<0.005$, wherein $n_x$ and $n_y$ represent in-plane refractive indices and $n_z$ the thickness-direction refractive index of the films, and wherein said optical compensation film has a positive in-plane retardation that satisfies the relations of $0.7 < R_{450}/R_{550} < 1$ and $1 < R_{650}/R_{550} < 1.25$, wherein $R_{450}$, $R_{550}$, and $R_{650}$ are in-plane retardations at the light wavelengths of 450 nm, 550 nm, and 650 nm respectively.

16 Claims, 2 Drawing Sheets

(52) U.S. Cl.
CPC .............. *G02B 1/04* (2013.01); *G02B 5/3083* (2013.01); *G02B 27/28* (2013.01); *G02F 2001/133637* (2013.01); *Y10T 428/24942* (2015.01); *Y10T 428/24975* (2015.01)

(58) Field of Classification Search
CPC ......... G02F 1/133528; G02F 1/134363; G02F 2413/11; C08J 5/18; C08J 2325/18; C09K 2219/03; C09D 125/18; G02B 1/04; G02B 5/3016; G02B 5/3083; B32B 27/36; B32B 23/20; B32B 2457/20
USPC ........ 349/117, 118, 120, 121; 428/1.3, 1.33, 428/98, 220
See application file for complete search history.

(56) References Cited

U.S. PATENT DOCUMENTS

| | | |
|---|---|---|
| 2008/0068545 A1 | 3/2008 | Doi et al. |
| 2008/0237552 A1 | 10/2008 | Zhang et al. |
| 2008/0241427 A1 | 10/2008 | Harris et al. |
| 2008/0241428 A1 | 10/2008 | Harris et al. |
| 2008/0241565 A1 | 10/2008 | Germroth et al. |
| 2009/0054638 A1* | 2/2009 | Shelby et al. .................. 536/65 |
| 2010/0029927 A1* | 2/2010 | Buchanan et al. .............. 536/68 |
| 2011/0076487 A1 | 3/2011 | Zheng et al. |
| 2012/0003403 A1 | 1/2012 | Wang et al. |

FOREIGN PATENT DOCUMENTS

| | | |
|---|---|---|
| WO | 2012003118 A1 | 1/2012 |
| WO | 2012040366 A2 | 3/2012 |

* cited by examiner

WIDE-VIEW OPTICAL FILM HAVING REVERSED WAVELENGTH DISPERSION

FIELD

This invention pertains to a wide-view optical film whose in-plane retardation exhibits the characteristic of reversed wavelength dispersion. More specifically, this invention relates to a wide-view optical film that is made by stretching a multilayer film comprising a polymer film and a retarder having positive out-of-plane birefringence. The optical film of the invention may be used in an optical device such as liquid crystal display (LCD), organic light emitting diode (OLED) display, 3D display, optical switch, or waveguide where a controlled light management is desirable.

BACKGROUND

It is known in the art of optical compensation that the phase retardation of light varies according to wavelength, causing color shift. This wavelength dependence (or dispersion) characteristic of the compensation film may be taken into account when designing an optical device so that color shift is reduced. Wavelength dispersion curves are defined as "normal (or proper)" or "reversed" with respect to the compensation film having positive or negative retardance (or retardation). A compensation film with positive retardance (positive A- or C-plate) may have a normal curve in which the value of phase retardation is increasingly positive toward shorter wavelengths or a reversed curve in which the value of phase retardation is decreasingly positive toward shorter wavelengths. A compensation film with negative retardance (negative A- or C-plate) may have a normal curve in which the value of phase retardation is increasingly negative toward shorter wavelengths or a reversed curve in which the value of phase retardation is decreasingly negative toward shorter wavelengths. Exemplary shapes of these curves are depicted in FIG. 1.

Wave plates are customarily named as follows in accordance with their refractive index profiles:
positive C-plate: $n_x=n_y<n_z$; negative C-plate: $n_x=n_y>n_z$
positive A-plate: $n_x>n_y=n_z$; negative A-plate: $n_x<n_y=n_z$
wherein, $n_x$ and $n_y$ represent in-plane refractive indices, and $n_z$ the thickness refractive index. The above wave plates are uniaxial birefringent plates. A wave plate can also be biaxial birefringent, where $n_x$, $n_y$, and $n_z$ are all not equal; it is customarily named as biaxial film.

An A-plate having in-plane retardation ($R_e$) equal to a quarter of the wavelength ($\lambda/4$) is called quarter wave plate (QWP). Likewise, an A-plate having $R_e$ equal to half of the wavelength ($\lambda/2$) is called half wave plate (HWP). An ideal achromatic QWP would be able to retard an incident polarized light by $\lambda/4$ at every wavelength. In order to achieve this, the wavelength dispersion of the QWP has to be reversed and satisfies the following equations:

$R_e(450)/R_e(550)=0.818$ and $R_e(650)/R_e(550)=1.182$, wherein $R_e(450)$, $R_e(550)$, and $R_e(650)$ are in-plane retardations at the light wavelengths of 450 nm, 550 nm, and 650 nm respectively. An achromatic (or broadband) wave plate is highly desirable since it can direct the light in the same manner at each wavelength to yield the optimal viewing quality. A common wave plate, however, exhibits a normal dispersion curve, which is not suitable for broadband wave plate application. Thus, there exists a need for a wave plate having reversed wavelength dispersion characteristics with respect to in-plane retardation.

A-plates are commonly used in liquid crystal displays (LCDs) as compensation films to improve the viewing angles. They can also be used in an OLED (organic light emitting diode) display device. For example, a QWP is being used with a linear polarizer to provide a circular polarizer in an OLED device to reduce the ambient light reflected by OLED for improved viewing quality. These applications typically utilize the in-plane retardation provided by the A-plate for in-plane phase-shift compensation. For example, A-plate combining with C-plate is particularly useful in reducing light leakage of the crossed polarizers at oblique viewing angles. The A-plate, however, also exhibits a negative out-of-plane retardation $R_{th}$, which is defined as $R_{th}=[n_z-(n_x+n_y)/2]\times d$ with a value of $|R_e/2|$ arising from its orientation. This characteristic can be beneficial when a negative $R_{th}$ is desirable in an optical device. For example, in a vertically aligned (VA) mode LCD, the liquid crystal molecules in the LC cell are aligned in a homeotropic manner, which results in positive retardation. An A-plate, thus, can provide an out-of-plane compensation in addition to in-plane compensation in VA-LCD. In other devices, such as in-plane switch (IPS) mode LCD and OLED display, however, the $R_{th}$ exhibited in the A-plate is not desirable since it can give rise to phase shift in off-axis light and lead to light leakage. Thus, there exists an additional need in the art to provide a positive in-plane retarder having reduced out-of-plane retardation for improved viewing angle and contrast ratio of the display.

U.S. Pat. No. 7,480,021 discloses an optical film having reversed birefringence dispersion comprising a first component having a normal dispersion and a second component having a reversed dispersion, wherein the two components have the same sign of birefringence.

U.S. Pat. No. 7,948,591 discloses a uniaxial retardation film satisfying the equations of 118 nm$\leq R_{xy}(550)\leq 160$ nm, $-10$ nm$\leq R_{yz}(550)\leq 10$ nm, $0.75\leq R_{xy}(450)/R_{xy}(550)\leq 0.97$, and $1.03\leq R_{xy}(650)/R_{xy}(550)\leq 1.25$. U.S. Pat. No. 8,139,188 discloses a biaxial retardation film satisfying the equations of 220 nm$\leq R_{xy}(550)\leq 330$ nm, 110 nm$\leq R_{xz}(550)\leq 165$ nm, $0.75\leq R_{xy}(450)/R_{xy}(550)\leq 0.97$, and $1.03\leq R_{xy}(650)/R_{xy}(550)\leq 1.25$. In both patents, no materials that can satisfy the specified equations are disclosed.

US Patent Application No. 2008/0068545 discloses a retardation film comprising a film, which is a film comprising a fumaric ester resin and satisfying $n_x<n_y\leq n_z$, and a film satisfying $n_y>n_x\geq n_z$ or $n_y>n_z\geq n_x$. The disclosed film may have a reversed dispersion characteristic.

US Patent Application No. 2012/0003403 discloses a multilayer film comprising (a) a layer (A) comprising cellulose ester having a degree of substitution of hydroxyl groups ($DS_{OH}$) of 0 to 0.5 and (b) a layer (B) comprising cellulose ester having a $DS_{OH}$ of 0.5 to 1.3, wherein the film has a reversed optical dispersion.

SUMMARY

This invention provides an optical compensation film, which is made by uniaxially or biaxially stretching of a multilayer film comprising,
  (a) a first polymer film having a refractive index profile satisfying the equations of $(n_x+n_y)/2\geq n_z$ and $|n_x-n_y|<0.005$ and
  (b) a second polymer film having a refractive index profile satisfying the equations of $(n_x+n_y)/2<n_z$ and $|n_x-n_y|<0.005$;
wherein $n_x$ and $n_y$ represent in-plane refractive indices and $n_z$ the thickness-direction refractive index of the films, and wherein said optical compensation film has a positive in-plane retardation that satisfies the relations of $0.7<R_{450}/R_{550}<1$ and $1<R_{650}/R_{550}<1.25$, wherein $R_{450}$, $R_{550}$, and $R_{650}$ are in-plane retardations at the light wavelengths of 450 nm, 550 nm, and 650 nm respectively.

In one aspect, the optical compensation film of the invention has an in-plane retardation ($R_e$) of about 80-300 nm at the wavelength ($\lambda$) 550 nm.

In another aspect, the optical compensation film of the invention has out-of-plane retardation ($R_{th}$) satisfying the equation of $|R_{th}|<80$ nm throughout the wavelength ranging from 400 to 800 nm.

This invention further provides a method for making the optical compensation film of the present invention.

DETAILED DESCRIPTION

Figure 1:
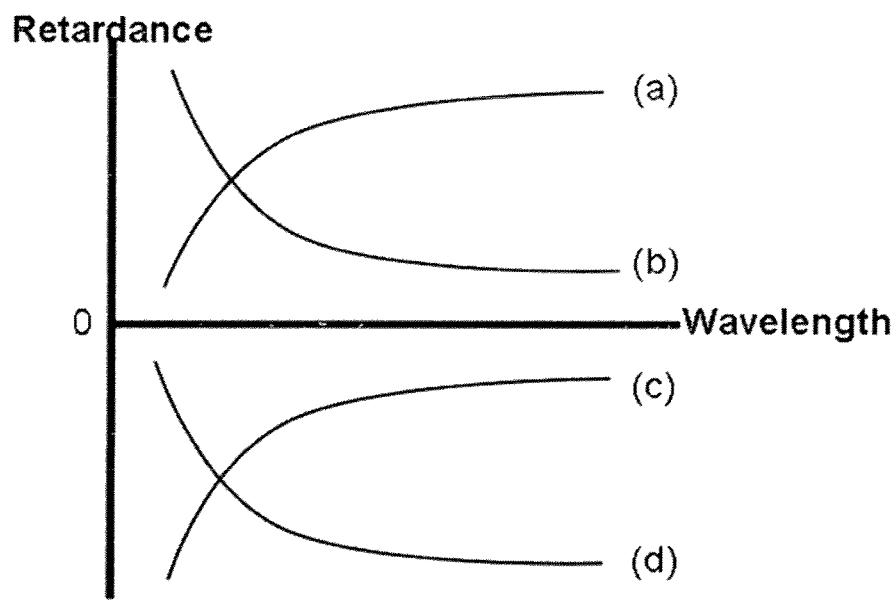
FIG. 1 is a graph depicting the shapes of exemplary wavelength dispersion curves for: (a) a reversed curve for positive retardation, (b) a normal curve for positive retardation, (c) a normal curve for negative retardation and (d) a reversed curve for negative retardation.

In one embodiment, there is provided an optical compensation film, which is made by uniaxially or biaxially stretching of a multilayer film comprising, (c) a first polymer film having a refractive index profile satisfying the equations of $(n_x+n_y)/2 \geq n_z$ and $|n_x-n_y|<0.005$ and, (d) a second polymer film having a refractive index profile satisfying the equations of $(n_x+n_y)/2 < n_z$ and $|n_x-n_y|<0.005$;

wherein $n_x$ and $n_y$ represent in-plane refractive indices and $n_z$ the thickness-direction refractive index of the films, and wherein said optical compensation film has a positive in-plane retardation that satisfies the relations of $0.7<R_{450}/R_{550}<1$ and $1<R_{650}/R_{550}<1.25$, wherein $R_{450}$, $R_{550}$, and $R_{650}$ are in-plane retardations at the light wavelengths of 450 nm, 550 nm, and 650 nm respectively.

The optical compensation film in accordance with the present invention has a positive in-plane retardation ($R_e$) and a reversed in-plane wavelength dispersion characteristic, in which the value of phase retardation is decreasingly positive toward shorter wavelengths. This dispersion characteristic is expressed by the ratios of the retardations as measured at the wavelengths of 450 nm, 550 nm, and 650 nm, which satisfy the relations of $R_{450}/R_{550}<1$ and $R_{650}/R_{550}>1$. The ratio of $R_{450}/R_{550}$ can be 0.71 to 0.99, 0.72 to 0.98, 0.74 to 0.97, 0.76 to 0.96, 0.78 to 0.95, 0.8 to 0.9, or 0.81 to 0.85. The ratio of $R_{650}/R_{550}$ can be 1.01 to 1.24, 1.02 to 1.23, 1.03 to 1.22, 1.04 to 1.21, 1.05 to 1.2, or 1.1 to 1.19.

Retardation (R) of a wave plate is defined as $R=\Delta n \times d$, wherein $\Delta n$ is the birefringence and d is the thickness of the wave plate. Birefringence is classified into in-plane birefringence $\Delta n_{in}=n_x-n_y$ and out-of-plane birefringence $\Delta n_{th}=n_z-(n_x+n_y)/2$. Thus, in-plane retardation is represented by $R_e=(n_x-n_y)\times d$ and out-of-plane retardation by $R_{th}=[n_z-(n_x+n_y)/2]\times d$.

Birefringence ($\Delta n$) of a wave plate may be measured by determining the birefringence of a wave plate over a wavelength range of about 400 nm to about 800 nm at different increments. Alternatively, birefringence may be measured at a specific light wavelength. Throughout this description, when a birefringence or retardation relation is given without specifying a wavelength, it is meant to be true throughout the wavelength range of about 400 nm to about 800 nm.

In one embodiment, the in-plane retardation ($R_e$) of the optical compensation film of this invention is about 80-300 nm at the wavelength ($\lambda$) 550 nm. In a further aspect, the optical compensation film in accordance with this invention is a quarter wave plate (QWP) having in-plane retardation ($R_e$) of about 120-160 nm at the wavelength ($\lambda$) 550 nm and having a reversed in-plane dispersion characteristic. In another aspect, said quarter wave plate is a broadband QWP, having $R_e$ equal to about $\lambda/4$ at each wavelength ranging from 400 nm to 800 nm.

Besides having a reversed in-plane dispersion characteristic, the optical film of the present invention is capable of providing a low out-of-plane retardation ($R_{th}$) value. The low $R_{th}$ is desirable particularly for display application since it can increase the viewing angle and improve the contrast ratio of an image. Thus, this invention further provides a wide-view optical film having an out-of-plane retardation ($R_{th}$) that satisfies the equation of $|R_{th}|<100$ nm, or <80 nm, or <50 nm, or <30 nm, or <10 nm, or <5 nm throughout the wavelength range of about 400 nm to about 800 nm.

This wide-view feature, when combined with the reversed dispersion characteristic of the present invention, will provide a broadband, wide-view wave plate for display application in LCD or OLED. A broadband, wide-view QWP is particular desirable since it can provide a broadband, wide-view circular polarizer when used in combination with a linear polarizer. Such a circular polarizer can be used in an OLED display device to reduce the ambient light and improve the viewing quality.

Thus, this invention further provides a circular polarizer comprising a linear polarizer and a wide-view QWP of the present invention. In another embodiment, there is provided an OLED display comprising a circular polarizer of the present invention.

In one embodiment, the first polymer film of (a) has an in-plane retardation ($R_e$) satisfying $|R_e|<100$ nm, or <50 nm, or <30 nm, or <10 nm.

In one aspect, the polymer film of (a) is a negative C-plate having a refractive index profile of $n_x=n_y>n_z$. In another aspect, the polymer film of (a) is an optically isotropic film having $n_x=n_y=n_z$.

Examples of the negative C-plate include, but not limited to, cellulose ester, polyimide, acrylic polymer, and polymer films having liquid crystalline moieties in the polymer chains or having liquid crystal molecules embedded in the polymer matrix. In one embodiment, the negative C-plate has an out-of-plane birefringence ($\Delta n_{th}$) satisfying the equation of $|\Delta n_{th}|>0.002$, or >0.005, or >0.01 or >0.015, or >0.02. A negative C-plate having higher $|\Delta n_{th}|$ is advantageous in that it is capable of providing higher positive $R_e$ values when stretched.

Examples of the isotropic film include cyclic polyolefin (COP), polycarbonate, polyester, cellulose ester, polysulfone, and acrylic polymer. It is noted that said isotropic films may still exhibit negligible differences in the values of $n_x$, $n_y$, and $n_z$, which could result in a relation of $(n_x+n_y)/2<n_z$ by a small value such as 0.001 or less. For the purpose of simplicity of the description, this would be considered as $(n_x+n_y)/2=n_z$ and is within the scope of the present invention.

The first polymer film of (a) will generate positive $R_e$ when stretched. The first polymer film of (a) is capable of producing flat or reversed dispersion curve when stretched. Films based on cellulose ester are found to be particularly suitable. Additionally, the present inventors have discovered that stretching of polymer films having higher negative $R_{th}$ leads to higher $R_e$ values. Thus, this invention further provides a first polymer film of (a) that is a cellulose ester film having an out-of-plane retardation ($R_{th}$) of −100 nm to −400 nm at the wavelength (λ) 550 nm and a thickness of 20-100 μm.

In one aspect, the second polymer film of (b) is a positive C-plate having a refractive index profile of $n_x=n_y<n_z$. Examples of the positive C-plate include, but not limited to, cellulose ester, polyester, polystyrene, polyacrylate, cellulose benzoate, cellulose acylate benzoate, cellulose arylate, cellulose acylate arylate, polymer films having liquid crystalline moieties in the polymer chains or having liquid crystal molecules embedded in the polymer matrix, poly(vinyl aromatics) as disclosed in US Patent Application Nos. 20080241565 and 20080241428, mesogen-jacked polymers as disclosed in US Patent Application No. 20080237552, and fluoropolymers as disclosed in US Patent Application No. 20110076487; the content of said US Patent Applications is incorporated herein by reference.

In one embodiment, the second polymer film of (b) has an out-of-plane birefringence ($\Delta n_{th}$) satisfying the equation of $\Delta n_{th}>0.005$, or $>0.01$, or $>0.15$, or $>0.2$. Higher birefringence materials have an advantage in that they can provide sufficient positive out-of-plane retardations ($R_{th}$) with thin films to reduce or eliminate the negative $R_{th}$ typically exhibited in the first polymer film of (a). The stretched multilayer films thus obtained will have wide-view characteristics. Particularly suitable for this purpose are homopolymers or copolymers of the monomers selected from the group comprising α,β,β-trifluorostyrene, α,β-difluorostyrene, β,β-difluorostyrene, α-fluorostyrene, and β-fluorostyrene. Poly(α,β,β-trifluorostyrene) is used in one example.

Stretching of the polymer film of (b) will result in a negative $R_e$ value and a normal dispersion curve, which when combined with the polymer film of (a) (for example, co-stretching) will provide the optical properties desirable in this invention positive $R_e$ and reversed dispersion curve.

In one embodiment, the second polymer film of (b) is prepared by solution cast on a substrate. The casting of a polymer solution onto a substrate may be carried out by a method known in the art such as, for example, spin coating, spray coating, roll coating, curtain coating, or dip coating. Substrates are known in the art, which include triacetylcellulose (TAC), cyclic olefin polymer (COP), polyester, polyvinyl alcohol, cellulose ester, cellulose acetate propionate (CAP), polycarbonate, polyacrylate, polyolefin, polyurethane, polystyrene, glass, and other materials commonly used in an LCD device.

Depending on the composition, the second polymer film of (b) may be soluble in, for example, toluene, methyl isobutyl ketone, cyclopentanone, methylene chloride, chloroform, 1,2-dichloroethane, methyl amyl ketone, methyl ethyl ketone, methyl isopropyl ketone, methyl isoamyl ketone, ethyl acetate, n-butyl acetate, propylene glycol methyl ether acetate, and mixtures thereof.

The solution-cast polymer film may be removed from the substrate upon drying to yield a free-standing film. The free-standing film can be attached to the polymer film of (a) by lamination. Alternatively, the second polymer film on a substrate is laminated onto the first polymer film and the substrate subsequently removed.

The multilayer film of the present invention may be obtained by lamination or co-extrusion of the first and the second polymer films, or it can be obtained by means of solution casting. In one embodiment, the solution of the second polymer of (b) is cast onto the first polymer film of (a) to obtain a multilayer film. The thickness of the polymer film in (a) or (b) as a laminated film can be from about 3 to about 150 μm or from about 20 to about 100 μm; whereas, the thickness as a coating film can be from about 2 to about 20 μm or from about 3 to about 10 μm.

In a further embodiment of the present invention, the first polymer film of (a) is a cellulose ester film having an out-of-plane retardation ($R_{th}$) of −100 to −400 nm at the wavelength (λ) 550 nm and a thickness of 20-100 μm, and the second polymer film of (b) is poly(α,β,β-trifluorostyrene) having a thickness of 2 to 20 μm.

Stretching of the multilayer film can be carried out by any method known in the art. The temperature suitable for stretching may be around the Tg of the first polymer film of (a), may be about 5-50° C. higher than said Tg, or may be about 5-50° C. lower than said Tg.

Alternatively, the coated film may be stretched while it still contains some solvent and is not completely dried (wet stretching). In this case, a lower temperature may be employed for stretching. It is also possible to stretch the coated film with a support underneath (e.g. on a steel belt); in this case, a higher temperature, for example, around the Tg of the polymer or about 5-30° C. higher may be used for stretching.

The extension ratio (elongation) of the film after stretching may be about 2-200% (defined as the percentage of the length that is longer than the unstretched film). In one embodiment, the extension ratio is about 2-100%.

This invention further provides a method for making a wide-view optical compensation film, which has a positive in-plane retardation that satisfies the relations of $0.7<R_{450}/R_{550}<1$ and $1<R_{650}/R_{550}<1.25$, comprising the steps of:
  I. dissolving a polymer whose solution cast film has a refractive index profile satisfying the equations of $(n_x+n_y)/2<n_z$ and $|n_x-n_y|<0.005$ in one or more organic solvents.
  II. solution casting the polymer solution of (i) on a polymer film having a refractive index profile satisfying the equations of $(n_x+n_y)/2 \geq n_z$ and $|n_x-n_y|<0.005$,
  III. allowing the resulting coating to dry until it is suitable for stretching, and
  IV. biaxially or uniaxially stretching the coated polymer film at a suitable temperature to a stretching ratio that is capable of providing said optical properties;

wherein $R_{450}$, $R_{550}$, and $R_{650}$ are in-plane retardations at the light wavelengths of 450 nm, 550 nm, and 650 nm respectively, and wherein $n_x$ and $n_y$ represent in-plane refractive indices and $n_z$ the thickness-direction refractive index of the films.

The optical compensation film of the present invention may be used in a liquid crystal display device including an in-plane switching liquid crystal display device, in an OLED display device, in a 3D display device, in a circular polarizer, or in 3D glasses. Said display devices may be used for television, computer, cell phone, camera, and the like.

EXAMPLES

Example 1: Stretched Multilayer Film 1 Having Reversed Dispersion Curve Based on Cellulose Ester A solution of poly(α,β,β-trifluorostyrene) (PTFS) was prepared by mixing PTFS powder (10 g; intrinsic viscosity=1.0 dL/g) and plasticizer (Abitol E available from Eastman Chemical Co.) (0.75 g) in the solvent, methyl isopropyl ketone (60.93 g). Separately, a sample (4 inch×4 inch) of a cellulose ester film (thickness, 80 μm) having $R_{th}(0.589)=-222$ nm and $R_e(589)$ 3.1 nm (essentially a negative C-plate) was prepared and treated with corona discharge using Laboratory Corona Treater (Model BD-20C; Electro-Technic Products, INC.) for about two minutes. The polymer solution was cast on half area of the cellulose ester film (thickness, 80 μm) using a knife applicator while leaving the other half uncoated. Immediately after casting, the coated film was placed in a force-air oven at 85° C. for 10 minutes to yield a dried coating. The thickness of the PITS coating was determined to be 13.75 μm by using Metricon Prism Coupler 2010 (Metricon Corp.).

A non-constrained uniaxial stretching method was used for film stretching. The half-coated film prepared above was mounted on a stretching machine (Karo IV laboratory film stretcher available from Brückner) equipped with a heating chamber in a manner that the coated/uncoated borderline is aligned along the stretching direction. The film was pre-heated for 25 seconds to reach the stretching temperature-173° C. and subsequently stretched in the machine direction (MD) at a speed of 7.0 mm/sec to a stretch ratio of 1.45. The transverse direction (TD) was left un-constrained.

After stretching, the retardations ($R_{th}$ and $R_e$) of the coated and uncoated parts of the cellulose ester film (CE-1) were measured by M-2000V Ellipsometer (J. A. Woollam Co.). The results are listed in Table 1, which shows the representative retardations at the wavelength 589 nm, $R_e(589)$ and $R_{th}(589)$, and the values of $R_e(450)/R_e(550)$ and $R_e(650)/R_e(550)$. When compared to the uncoated part of the film, the coated film is characterized in that it has lower in-plane retardation ($R_e$), reduced absolute value of out-of-plane retardation, and much steeper reversed wavelength dispersion as depicted in FIG. 1. The film thus obtained has a $R_e$ value of 130 nm, which is in the range of a quarter wave plate.

TABLE 1

Retardations of the Stretched Cellulose Film 1

| | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|
| CE-1 without Coating | 1 × 1.45 | 247 | −142 | 0.987 | 1.005 |
| CE-1 with Coating | 1 × 1.45 | 130 | −78 | 0.909 | 1.047 |

Figure 2:
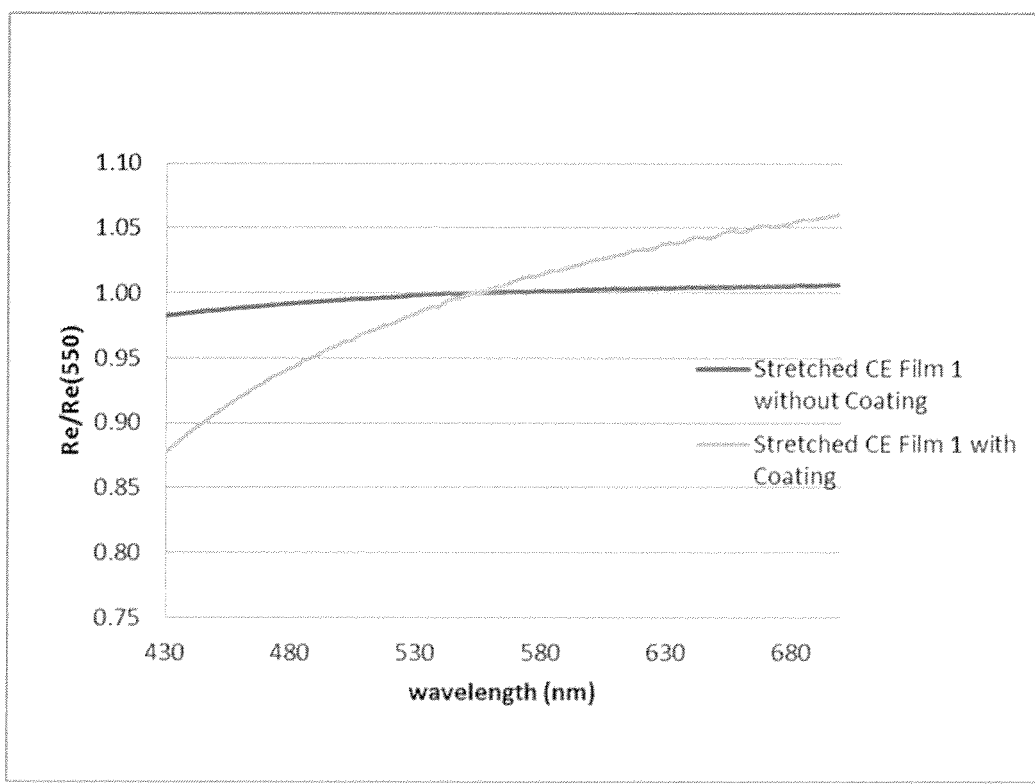
FIG. 2 is a graph depicting the wavelength dispersions of stretched cellulose ester film 1 with and without coating.

Example 2: Stretched Multilayer Film 2 Having Reversed Dispersion Curve Based on Cellulose Ester A second cellulose film was prepared and coated with the PIES solution (dried coating thickness: 11.91 μm) as described in Example 1. The resulting film (CE-2) was stretched according to Example 1 at 173° C. to a stretch ratio of 1.40. The results are listed in Table 2 and plotted in FIG. 2. When compared to the uncoated part of the film, the coated film is characterized in that it has lower in-plane retardation ($R_e$), reduced absolute value of out-of-plane retardation, and much steeper reversed wavelength dispersion as depicted in FIG. 2.

TABLE 2

Retardations of the Stretched Cellulose Film 2

| | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|
| CE-2 without Coating | 1 × 1.40 | 232 | −144 | 0.988 | 1.005 |
| CE-2 with Coating | 1 × 1.40 | 100 | −67 | 0.896 | 1.052 |

Figure 3:
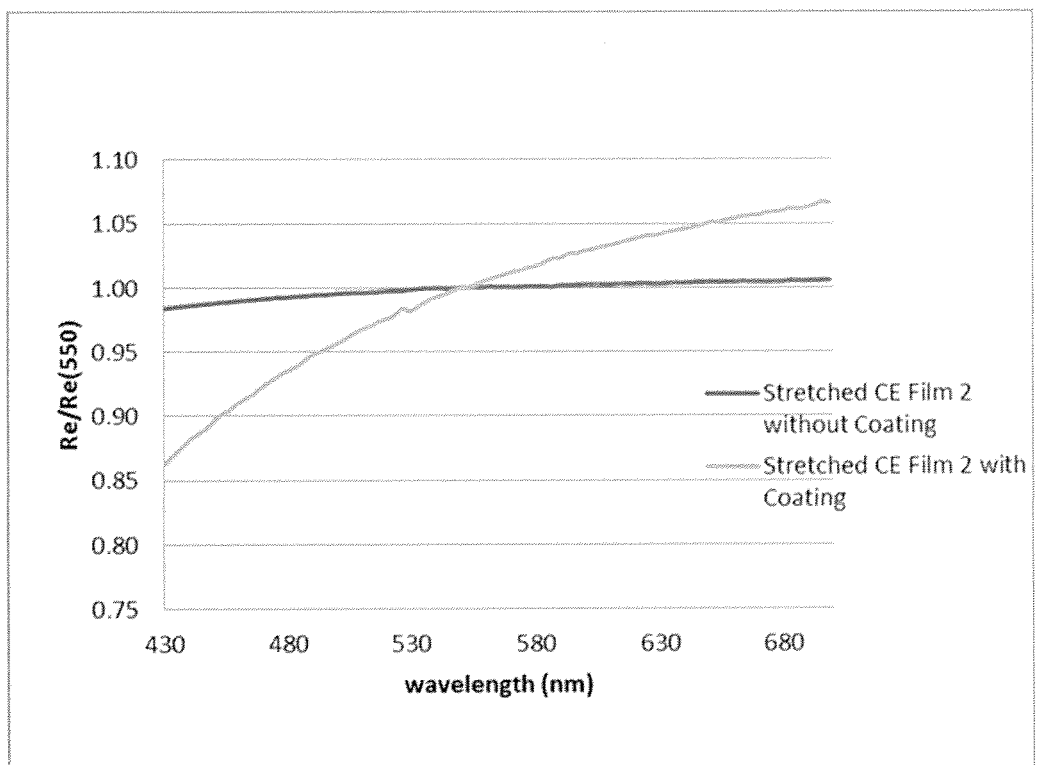
FIG. 3 is a graph depicting the wavelength dispersions of stretched cellulose ester film 2 with and without coating; and, FIG. 4 is a graph depicting the wavelength dispersions of stretched cellulose ester film 3 with and without coating.
Figure 4:
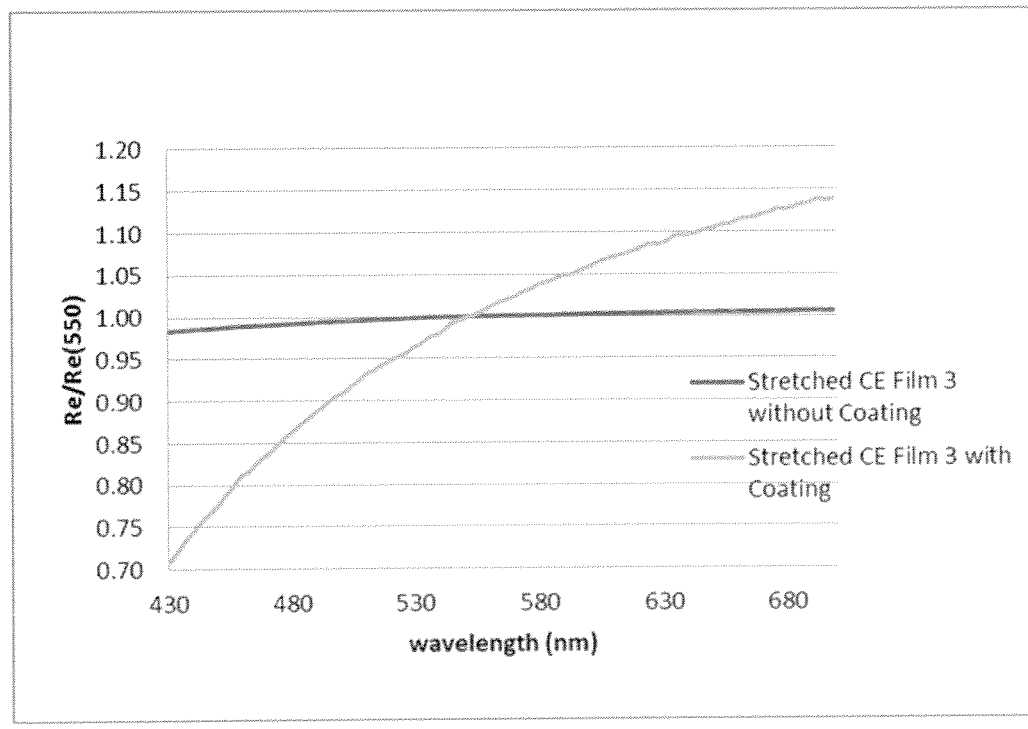

Example 3: Stretched Multilayer Film 3 Having Reversed Dispersion Curve Based on Cellulose Ester A third cellulose film was prepared and coated with the PTFS solution (dried coating thickness: 17.79 μm) as described in Example 1. The resulting film (CE-3) was stretched according to Example 1 at 173° C. to a stretch ratio of 1.45. The results are listed in Table 3 and plotted in FIG. 3. When compared to the uncoated part of the film, the coated film is characterized in that it has lower in-plane retardation ($R_e$), reduced absolute value of out-of-plane retardation, and much steeper reversed wavelength dispersion as depicted in FIG. 3.

TABLE 3

Retardations of the Stretched Cellulose Film 3

| | Stretch Ratio (TD × MD) | $R_e(589)$, nm | $R_{th}(589)$, nm | $R_e(450)/R_e(550)$ | $R_e(650)/R_e(550)$ |
|---|---|---|---|---|---|
| CE-2 without Coating | 1 × 1.45 | 253 | −151 | 0.987 | 1.004 |
| CE-2 with Coating | 1 × 1.45 | 50 | −31 | 0.777 | 1.108 |

Example 4: Stretched Multilayer Films Having Reversed Dispersion Curve Based on COP A cyclic olefin polymer (COP) film was used as the base film for this study. The film has a thickness of 98 μm and retardations of $R_e(589)=3.41$ nm and $R_{th}(589)=-10.65$ nm, indicating essentially an optically isotropic film. Four COP films were prepared (4 inch×4 inch) and coated with the PTFS solution as described in Example 1. The resulting films (COP-1 to -4) were stretched according to Example 1 at 150° C. to a stretch ratio ranging from 1.40 to 1.5. The results are listed in Table 4. The dispersion curves of the coated films thus obtained all have reversed wavelength dispersion characteristics as indicated by the values of $R_e(450)/R_e(550)$ and $R_e(650)/R_e(550)$, although they are much flatter as compared to those of cellulose ester based films.

TABLE 4

Retardations of the Stretched COP Films

|  | Stretch Ratio (TD × MD) | Coating Thickness after Stretching, μm | $R_e$ (589), nm | $R_{th}$ (589), nm | $R_e$ (450)/ $R_e$ (550) | $R_e$ (650)/ $R_e$ (550) |
|---|---|---|---|---|---|---|
| COP-1 without coating | 1 × 1.5 | N/A | 174 | −119 | 1.009 | 0.995 |
| COP-1 with coating | 1 × 1.5 | 4.30 | 98 | −18 | 0.970 | 1.015 |
| COP-2 without coating | 1 × 1.45 | N/A | 204 | −132 | 1.009 | 0.995 |
| COP-2 with coating | 1 × 1.45 | 4.28 | 117 | −37 | 0.975 | 1.014 |
| COP-3 without coating | 1 × 1.40 | N/A | 190 | −118 | 1.009 | 0.995 |
| COP-3 with coating | 1 × 1.40 | 7.58 | 85 | 9 | 0.955 | 1.022 |
| COP-4 without coating | 1 × 1.43 | N/A | 172 | −117 | 1.009 | 0.995 |
| COP-4 with coating | 1 × 1.43 | 7.69 | 76 | 11 | 0.935 | 1.035 |

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:
1. An optical compensation film comprising:
a first polymer film and a second polymer film that form a multilayer film, wherein
(a) the first polymer film has a refractive index profile satisfying the equations of $(n_x+n_y)/2 \geq n_z$ and $|n_x-n_y|<0.005$; wherein the first polymer film is either 1) a negative C-plate having a refractive index profile of $n_x=n_y>n_z$ and comprises a cellulose ester film having an out-of-plane retardation ($R_{th}$) of −100 to −400 nm at the wavelength (λ) 550 nm, and a thickness of 20-100 μm or 2) an isotropic film selected from the group consisting of cyclic polyolefin (COP), polycarbonate, polyester, polysulfone, and acrylic polymer having a refractive index profile of $n_x=n_y=n_z$; and
(b) the second polymer film having a refractive index profile satisfying the equations of $(n_x+n_y)/2<n_z$ and $|n_x-n_y|<0.005$; wherein the second polymer film is a positive C-plate having a refractive index profile of $n_x=n_y<n_z$; and wherein the second polymer film has an out of plane birefringence ($\Delta n_{th}$) satisfying the equation of $\Delta n_{th}>0.01$ and is a homopolymer or a copolymer of monomers selected from the group comprising α,β,β-trifluorostyrene, α,β-difluorostyrene, β,β-difluorostyrene, α-fluorostyrene, and β-fluorostyrene,
wherein $n_x$ and $n_y$ represent in-plane refractive indices and $n_z$ the thickness-direction refractive index of the films, and wherein said optical compensation film has a positive in-plane retardation and reversed in plane wavelength dispersion characteristics that satisfy the relations of $0.7<R_{450}/R_{550}<1$ and $1<R_{650}/R_{550}<1.25$, wherein $R_{450}$, $R_{550}$, and $R_{650}$ are in-plane retardations at the light wavelengths of 450 nm, 550 nm, and 650 nm respectively, wherein the optical compensation film is formed by uniaxially or biaxially stretching the multilayer film formed from the combination of the first polymer film layer and the second polymer film layer, and wherein the resulting optical compensation film has an out of plane retardation ($R_{th}$) that satisfies the equation of $|R_{th}|<100$ nm throughout the wavelength range of about 400 nm to about 800 nm.

2. The optical compensation film of claim 1, wherein the second polymer film of (b) has an out-of-plane birefringence ($\Delta n_{th}$) satisfying the equation of $\Delta n_{th}>0.15$ or $>0.2$.

3. The optical compensation film of claim 1, wherein the second polymer film of (b) is poly(α, β, β-trifluorostyrene).

4. The optical compensation film of claim 1, wherein the optical compensation film has an in-plane retardation ($R_e$) of about 80-300 nm at the wavelength (λ) 550 nm.

5. The optical compensation film of claim 1, wherein the optical compensation film has an in-plane retardation ($R_e$) of about 120-160 nm at the wavelength (λ) 550 nm.

6. The optical compensation film of claim 1, wherein the optical compensation film has an in-plane retardation ($R_e$) equal to about λ/4 at each wavelength ranging from 400 nm to 800 nm.

7. The optical compensation film of claim 1, wherein the optical compensation film has an out-of-plane retardation ($R_{th}$) satisfying the equation of $|R_{th}|<80$ nm throughout the wavelength ranging from 400 to 800 nm.

8. The optical compensation film of claim 5, wherein the optical compensation film has an out-of-plane retardation ($R_{th}$) satisfying the equation of $|R_{th}|<80$ nm throughout the wavelength ranging from 400 to 800 nm.

9. The optical compensation film of claim 1, wherein the optical compensation film has a positive in-plane retardation satisfying the relations of $0.76<R_{450}/R_{550}<0.96$ and $1.03<R_{650}/R_{550}<1.22$.

10. The optical compensation film of claim 1, wherein the first polymer film of (a) and the second polymer film of (b) are laminated.

11. The optical compensation film of claim 1, wherein the second polymer film of (b) is coated on the first polymer film of (a).

12. The optical compensation film of claim 11, wherein the second polymer film of (b) has a thickness of 2 to 20 μm.

13. The optical compensation film of claim 1, wherein the first polymer film of (a) is a cellulose ester film having an out-of-plane retardation ($R_{th}$) of −100 to −400 nm at the wavelength (λ) 550 nm and a thickness of 20-100 μm, and the second polymer film of (b) is poly(α, β, β-trifluorostyrene) having a thickness of 2 to 20 μm.

14. A circular polarizer comprising the optical compensation film of claim 1.

15. A liquid crystal display comprising the optical compensation film of claim 1.

16. An OLED display comprising the optical compensation film of claim 1.

* * * * *